(12) United States Patent
Hauenschild et al.

(10) Patent No.: US 9,784,995 B2
(45) Date of Patent: Oct. 10, 2017

(54) MULTI-SEGMENT RING MODULATOR

(71) Applicant: RANOVUS INC., Ottawa (CA)

(72) Inventors: Juergen Hauenschild, Bochum (DE); David John Nicholson, Ottawa (CA); Dylan Logan, Ottawa (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 14/976,290

(22) Filed: Dec. 21, 2015

(65) Prior Publication Data

US 2017/0176779 A1      Jun. 22, 2017

(51) Int. Cl.
   *G02F 1/035*   (2006.01)
   *G02F 1/01*    (2006.01)

(52) U.S. Cl.
   CPC ............ *G02F 1/0121* (2013.01); *G02F 1/011* (2013.01); *G02F 1/0147* (2013.01); *G02F 2201/06* (2013.01)

(58) Field of Classification Search
   None
   See application file for complete search history.

(56) References Cited

U.S. PATENT DOCUMENTS

| | | | | |
|---|---|---|---|---|
| 5,475,704 A * | 12/1995 | Lomashevich | .... | G02B 6/12004 372/21 |
| 7,733,558 B2 * | 6/2010 | Arai | .................. | G02B 26/0841 359/198.1 |
| 2005/0206479 A1 * | 9/2005 | Nguyen | ............... | H03H 3/0072 333/186 |
| 2007/0052498 A1 * | 3/2007 | Pan | ...................... | H03H 3/0077 333/186 |
| 2011/0058765 A1 | 3/2011 | Xu | | |
| 2013/0251300 A1 * | 9/2013 | Suzuki | .................. | G02F 1/3132 385/2 |
| 2014/0321848 A1 * | 10/2014 | Sekiguchi | ............. | G02F 1/0123 398/38 |
| 2015/0261061 A1 * | 9/2015 | Akiyama | ................ | G02F 1/225 385/2 |

(Continued)

OTHER PUBLICATIONS

Hai, Mohammed Shafiqul, et al., "A Low-voltage PAM-4 SOI Ring-based Modulator", OFC2015, TuB3.3.,pp. 194-195, IEEE, Published Oct. 12, 2014.

(Continued)

*Primary Examiner* — Tina Wong
(74) *Attorney, Agent, or Firm* — Perry + Currier, Inc.

(57) ABSTRACT

A device that includes a multi-segment ring modulator is provided. In particular, the device comprises: an optical waveguide; an optical ring modulator optically coupled to the optical waveguide; a first voltage control device along a first segment of the optical ring modulator; a second voltage control device along a second segment of the optical ring modulator; a first driver device configured to control the first voltage control device to a first voltage and a second voltage; and, a second driver device configured to control the second voltage control device to a third voltage and a fourth voltage. In particular implementations, a ratio of a length of the first segment to a length of the second segment can be one or more of about 2:1 and greater than 1:1, and non-linear driver devices can be used.

12 Claims, 4 Drawing Sheets

(56) References Cited

U.S. PATENT DOCUMENTS

2015/0316794 A1* 11/2015 Hayakawa ........... H04B 10/501
                                                              385/2
2016/0103382 A1   4/2016 Liboiron-Ladouceur et al.
2016/0156149 A1*  6/2016 Takabayashi ........... H01S 5/142
                                                              372/6

OTHER PUBLICATIONS

Karimelahi, Samira, et al., "PAM-N signaling by coupling modulation in a ring resonator", Optics Letters/, vol. 40, No. 3, Feb. 1, 2015, pp. 332-335. Published Feb. 1, 2015.

Wu, Xiaotie, et al., "A 20Gb/s NRZ/PAM-4 1V Transmitter in 40nm CMOS Driving a Si-Photonic Modulator in 0.13μm CMOS", ISSCC 2013, Session 7, Optical Transceivers and Silicon Photonics, 7.7, 2013 IEEE International Solid-State Circuits Conference. Published Feb. 17, 2013.

Extended European Search Report dated May 4, 2017 for European Patent Application No. 16205882.0.

* cited by examiner

MULTI-SEGMENT RING MODULATOR

The specification relates generally to telecommunication devices, and specifically to a device that includes a multi-segment ring modulator.

BACKGROUND

Modulating optical signals for PAM-N (pulse amplitude modulation to "N" levels) is generally performed using Mach-Zehnder (MZ) modulators with multi-segment phase shifters, or MZ-ring hybrid modulators. Such MZ modulators are large (about 1 mm) compared to other optical devices in high density photonic integrated circuits (PICs), resulting in PICs of lower density. While MZ assisted ring modulators are about an order of magnitude smaller (phase shifter length of 340 um), they are still large compared to other optical device in high density PICs. While some MZ coupled ring modulator designs have been demonstrated they have relatively slow speeds (e.g. about 120 Mb/s). Alternatively, single electrode modulators can be driven to different voltage levels using linear drivers, but these drivers require high power dissipation to achieve linear performance.

SUMMARY

The present specification provides a device that includes an optical ring modulator on an optical waveguide (and/or optical bus) with at least two voltage control devices (each of which can include, but is not limited to, electrode pairs) along respective segments of the optical ring modulator, which are independently controlled using respective driver devices. For example, each voltage control device can comprise a diode, which can be driven in reverse bias so it acts as a capacitor to generate an electrical field across the ring and thereby change respective optical properties of a respective segment, which in turn shifts the resonance properties of the optical ring modulator. Each voltage control device is controlled by a respective driver device to two different voltage values. The resonance shift provided by each segment is generally proportional to its length. A length of a segment of first voltage control device can be longer than a segment of a second voltage control device (e.g. in a ratio of about 2:1, which can be adjusted to adjust the degree of resonance shift; either way, the ratio of the lengths of the segments of the two voltage control devices is greater than 1:1); in these implementations, the respective two voltages to which each voltage control device are driven can be the same (e.g. each voltage control device can be driven with identical voltage levels), and hence non-linear driver devices can be used. However, when the lengths are about the same, the voltages to which each voltage control device are driven are different, and linear drive devices can be used; however this implementation can have generally higher power dissipation as compared to the greater than 1:1 case, where non-linear drivers can be used. Either way, amplitude of an optical signal on the optical waveguide can be modulated by the optical ring modulator to four different amplitudes to encode data therein to achieve PAM-4 modulation. In other words, four different voltage conditions can be applied to the optical ring modulator resulting in four different amplitude modulation conditions. Adding a third voltage control device along a third segment of the optical ring modulator, and a corresponding third driver device, results in an optical signal on the optical waveguide being modulated to eight different amplitudes to encode data therein to achieve PAM-8 modulation. In other words, for each additional voltage control device added along an additional segment of the optical ring modulator, an additional bit can be added to the modulation scheme. Use of such devices can hence generally eliminate a need for a PAM encoder in optical transmission devices in optical communication systems.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: an optical waveguide; an optical ring modulator optically coupled to the optical waveguide; a first voltage control device along a first segment of the optical ring modulator; a second voltage control device along a second segment of the optical ring modulator; a first driver device configured to control the first voltage control device to a first voltage and a second voltage; and, a second driver device configured to control the second voltage control device to a third voltage and a fourth voltage.

A ratio of the first segment, where the first voltage control device is located, to the second segment, where the second voltage control device is located can be about 2:1, the first voltage being about equal to the third voltage, and the second voltage being about equal to the fourth voltage.

A ratio of the first segment, where the first voltage control device is located, to the second segment, where the second voltage control device is located, can be one or more of greater than 1:1 and about 2:1, the first voltage being about equal to the third voltage, and the second voltage being about equal to the fourth voltage. Each of the first driver device and the second driver device can comprise a respective non-linear driver device.

A ratio of the first segment, where the first voltage control device is located, to the second segment, where the second voltage control device is located can be about 1:1, wherein at least one of: the third voltage is different from the first voltage; and the fourth voltage is different from the second voltage. The third voltage can be about the same as the first voltage, and fourth voltage can be different from the second voltage.

Each of the first voltage control device and the first voltage control device can comprise a respective diode, a respective junction of the respective diode located along a respective segment of the optical ring modulator.

Each of the first voltage control device and the first voltage control device can comprise a respective diode, each of the first driver device and the second driver device configured to operate the respective diode in a reverse bias mode.

The device can further comprise: further comprising: one or more further voltage control devices along respective further segments of the optical ring modulator; and, one or more further driver devices each configured to control a respective further voltage control device to two respective voltages.

The device can further comprise a controller in communication with the first driver device and the second driver device, the controller configured to: convert data to be transmitted along the optical waveguide into a pulse amplitude modulation (PAM) compatible format; and control each of the first driver device and the second driver device to in turn control a respective voltage control device to modulate an optical signal on the optical waveguide to encode the data therein.

The device can further comprise a heater configured to maintain a given temperature of the optical ring modulator.

The device can further comprise a laser configured to provide an optical signal along the optical waveguide, the optical signal modulated by the optical ring modulator.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
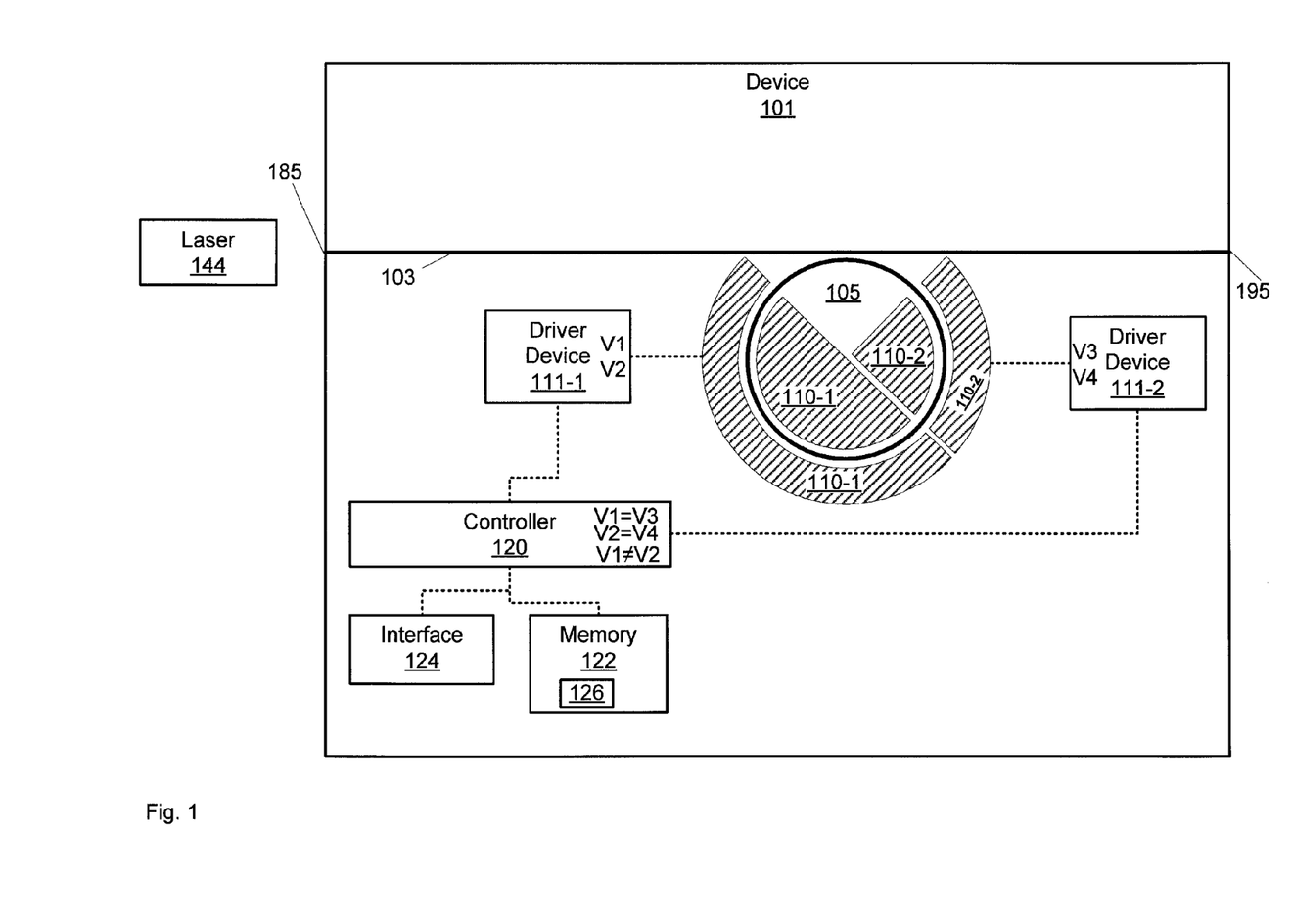
FIG. 1 depicts a schematic diagram of a device that includes a two-segment optical ring modulator of different lengths, according to non-limiting implementations.

FIG. 1 depicts a device 101 comprising: an optical waveguide 103; an optical ring modulator 105 optically coupled to optical waveguide 103; a first voltage control device 110-1 along a first segment of optical ring modulator 105; a second voltage control device 110-2 along a second segment of optical ring modulator 105; a first driver device 111-1 configured to control first voltage control device 110-1 to a first voltage V1 and a second voltage V2; and, a second driver device 111-2 configured to control second voltage control device 110-2 to a third voltage V3 and a fourth voltage V4. Optical ring modulator 105 will hereafter be interchangeably referred to as ring 105. In general, as described in detail below, device 101 can convert two synchronized and phase aligned NRZ electrical signals into a PAM4 optical signal which can generally eliminate a need for a PAM4 encoder at device 101. Furthermore, in some implementations, each of first driver device 111-1 and second driver device 111-2 can comprise a non-linear driver device which can operate at speeds greater and/or power dissipation lower than linear driver devices; hence, device 101 can provide PAM4 encoding without a PAM4 encoder, and utilize non-linear drivers.

First voltage control device 110-1 and second voltage control device 110-2 will hereafter be referred to, collectively, voltage control devices 110 and, generically, as a voltage control device 110; and first driver device 111-1 and second driver device 111-2 will hereafter be referred to, collectively, driver devices 111 and, generically, as a driver device 111.

For clarity, in FIG. 1 and through-out the present specification, solid lines connecting components depict links and/or optical waveguides that include flow of optical signals there between, while stippled lines connecting components depict links that include flow electrical data and/or electrical signals there between. Hence, driver devices 111 are electrically connected to respective voltage control devices 110, and ring 105 is optically coupled to optical waveguide 103 over which optical data signals are carried.

As depicted, device 101 further comprises a controller 120, in communication with driver devices 111, a memory 122 and an interface 124 each interconnected with controller 120. In particular, memory 122 stores an application 126, which, when processed by controller 120, enables controller to control driver devices 111 to in turn control voltage control devices 110.

While ring 105 is depicted as circular, it is appreciated that ring 105 can be elliptical and/or racetrack shaped and/or vary from a circular shape, as long as ring 105 is closed and is coupled to optical waveguide 103; while not depicted, coupling devices can be located at an interface of ring 105 and optical waveguide 103 to facilitate coupling thereof. Furthermore, while also while not depicted, ring 105 can be coupled to one or more additional optical waveguides and/or optical buses, including, but not limited to, one or more drop ports. In addition, optical waveguide 103 can comprise an optical bus which can be used to convey more than one optical signal; indeed, optical waveguide 103 can be interchangeably referred to as an optical bus.

While not depicted device 101 further comprises a heater configured to maintain a given temperature of ring 105; the heater can be controlled by controller 120; for example, the heater can about parallel to ring 105, but can be located on either side of a plane defined by ring 105.

Indeed, voltage control devices 110 are appreciated to be depicted schematically as along a respect segment of ring 105, with a portion of each voltage control device 110 located inside and outside of ring 105; however, in practise, voltage control device 110 can comprise electrodes "above" and "below" ring 105 (e.g. out of and into the page of FIG. 1), which are controlled by controller 120.

In particular, each voltage control device 110 can comprise a respective diode, and specifically a PN-diode, a respective junction of each respective diode located along a respective segment of optical ring modulator 105. In these implementations, each of first driver device 111-1 and second driver device 111-2 can be configured to operate the respective diode, such that a change in voltage modifies a charge carrier density and/or refractive index of a respective segment of ring 105. For example, each of first driver device 111-1 and second driver device 111-2 can be configured to operate a respective diode in either a forward bias (and/or injection) mode or a reverse bias (and/or depletion) mode. In particular implementations, however, each of first driver device 111-1 and second driver device 111-2 can be configured to operate a respective diode in a reverse bias mode. Hence, in yet further implementations, each voltage control device 110 can comprise a capacitor, with a respective segment of ring 105 located between electrodes and/or "plates" of the capacitor. Either way, voltage control device 110 can apply electric field across a respective segment of ring 105 to change physical and/or optical properties thereof, and hence change a resonance condition of ring 105.

For example, in general, a resonance and/or reference frequency of an optical ring resonator can be coarsely controlled by controlling a diameter and/or circumference and/or a refractive index of an optical ring resonator (e.g. during fabrication thereof) and/or finely controlled by controlling the temperature of the optical ring resonator. As such, the heater can be used to tune the refractive index of a portion of ring 105 to coarsely control a reference resonance frequency, while each voltage control device 110 is used to change the refractive index of a respective segment of ring 105 to modulate the reference resonance frequency which in turn causes optical signals on optical waveguide 103 to be modulated, as described in further detail below.

Each driver device 111 is configured to control a respective voltage control device 110 to one of two respective voltages (voltages V1, V2 for voltage control device 110-1, and voltages V3, V4 for voltage control device 110-2), such that the voltages are applied across a respective segment of ring 105. Each driver device 111 can comprise a non-linear driver device or a linear driver device. When a ratio of the first segment (along which the voltage control device 110-1 is located) to the second segment (along which second voltage control device 110-2 is located) is greater than 1:1 (for example, as depicted, about 2:1), each of first driver device 111-1 and second driver device 111-2 can comprises a respective non-linear driver device. Application of voltages V1, V2, V3, V4 are described in further detail below.

However, when a ratio of the first segment (along which the voltage control device 110-1 is located) to the second segment (along which second voltage control device 110-2 is located) is about 1:1 (e.g. see FIG. 3), each of first driver device 111-1 and second driver device 111-2 can comprise a respective linear driver device. While such an implementation can comprise an adaption of a single diode modulator that also uses a linear driver device, such implementations are generally slower than implementations where non-linear driver devices are used. Hence, alternatively, when a ratio of the first segment to the second segment is about 1:1, each of first driver device 111-1 and second driver device 111-2 can comprise a respective non-linear driver device but operated voltages in about a 2:1 ratio, which can be challenging to implement (e.g. non-linear driver devices operated with different amplitudes).

In particular, in some implementations, each driver device 111 can comprise a non-linear CMOS (complementary metal-oxide-semiconductor) driver device.

As depicted, device 101 further comprises a laser 144, and optical waveguide 103 is configured to receive optical signals from laser 144 at an optical input 185 thereof, the optical waveguide 103 further configured to convey the optical signals to an optical output 195. In general, ring 105 modulates the optical signals, and in particular optical signals of a given frequency and/or a given wavelength.

Controller 120 is generally configured to control driver devices 111 to, in turn, apply voltages V1, V2, V3, V4 along a respective segment of ring 105, to modulate the given optical signal being conveyed along optical waveguide 103 based, for example, on input received from interface 124. Hence, a modulated optical signal produced by ring 105 has data encoded therein, and can be conveyed through an optical telecommunication network. Such data can include, but is not limited to, voice, audio, video, images, web data, browser data, and the like.

In particular, controller 120 can be configured to: convert data to be transmitted along optical waveguide 103 into a pulsed modulate amplitude (PAM) compatible format; and control each of first driver device 111-1 and second driver device 111-2 to in turn control a respective voltage control device 110 to modulate an optical signal on optical waveguide 103 to encode the data therein.

For example, laser 144 can comprise a distributed Bragg reflector laser, an external cavity laser and the like configured to output optical signals (e.g. light) of a plurality of different wavelengths (and/or frequencies), for example with a frequency constant spacing, into optical waveguide 103; ring 105 can hence be configured to resonate at a given wavelength of the plurality of different wavelengths such that an optical signal of the given wavelengths is modulated by ring 105 to produce a modulated optical signal.

In general, the modulated optical signal is conveyed out of device 101 on output waveguide 103 at output 195, for example to a fiber optic, which in turn conveys the modulated optical signal through an optical telecommunication network to a receiver, where the modulated optical signal is received and demodulated to retrieve data encoded therein.

Hence, device 101 can generally comprise a transmitter in an optical telecommunications system configured to generate and transmit a modulated optical signal at a given optical frequency (and a given data rate), the modulated optical signal having data encoded therein. As such, an optical wavelength and/or optical frequency provided by laser 144 can comprise a given carrier optical wavelength and/or a given carrier optical frequency including, but not limited to, an optical frequency used in optical telecommunications in a range of about 184.5-238 THz (and corresponding wavelengths); however other optical frequencies (and/or wavelengths) are within the scope of present implementations.

While not depicted, device 101 can be further configured to optically interface with an optical fiber (e.g. at output 195), and device 101 can hence transmit the modulated optical signal through the optical fiber, which can be hundreds of kilometers long (or more). Device 101 can hence comprise a modulating optical signal generator including, but not limited to, one or more lasers, including laser 144 which can be internal or external (as depicted) to device 101, one more light emitting diodes (LEDs), and the like, as well as one or more interfaces (such as interface 124) to data generating devices, including, but not limited to, servers, personal computers, laptops, mobile devices and the like, and the like.

It should be emphasized, however, that the structure of device 101 in FIG. 1 is purely an example, and contemplates a device that can be used for optical data communications. In particular, at least optical waveguide 103 and ring 105 can be formed from a photonic integrated circuit (PIC); indeed, any components of device 101 that convey and/or interact with optical signals can be formed from a PIC. In particular non-limiting implementations, components of device 101 that convey and/or interact with optical signals can be formed from a silicon based PIC, however other materials are within the scope of present implementations.

Controller 120 can comprise a processor and/or a plurality of processors, including but not limited to one or more central processors (CPUs) and/or one or more processing units; either way, controller 120 comprises a hardware element and/or a hardware processor. Indeed, in some implementations, controller 120 can comprise an ASIC (application-specific integrated circuit) and/or an FPGA (field-programmable gate array) specifically configured to implement the functionality of controller 120. Hence, controller 120 is not necessarily a generic computing device and/or a generic processor and/or a generic component of computing controller 120, but a device specifically configured to implement specific functionality; such specific functionality includes controlling driver devices 111 to modulate an optical signal on optical waveguide 103 according to a PAM-N protocol, as described in further detail below. For example, controller 120 can specifically comprise an engine configured to modulate an optical signal on optical waveguide 103 according to a PAM-N protocol.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 120 and/or device 101 as described herein are typically maintained, persistently, in memory 122 and used by controller 120 which makes appropriate utilization of volatile storage during the execution of such programming instructions. Those skilled in the art recognize that memory 122 is an example of computer readable media that can store programming instructions executable on controller 120. Furthermore, memory 122 is also an example of a memory unit and/or memory module and/or a non-volatile memory.

In particular, memory 122 stores application 126 that when processed by controller 120 enables controller 120 to modulate an optical signal on optical waveguide 103 according to a PAM-N protocol by controlling driver devices 111.

Interface 124 can comprise any wired and/or wireless interface configured to receive data used to modulate optical signals. As such, interface 124 is configured to correspond with communication architecture that is used to implement one or more communication links used to receive data, including but not limited to any suitable combination of, cables, serial cables, USB (universal serial bus) cables, and wireless links (including, but not limited to, WLAN (wireless local area network) links, WiFi links, WiMax links, cell-phone links, Bluetooth™ links, NFC (near field communication) links, packet based links, the Internet, analog networks, access points, and the like, and/or a combination). However, interface 124 is generally non-limiting and any interface used in optical telecommunication devices and/or optical telecommunication transmitters is within the scope of present implementations.

Operation of device 101 will now be described in more detail.

It is further appreciated that, in FIG. 1, length of a segment of ring 105 along which first voltage device 111-1 is located is about twice a respective length of a segment of ring 105 along which second voltage device 111-2 is located. For example, first voltage device 111-1 is located along about half of ring 105, while second voltage device 111-2 is located along about a quarter of ring 105, with the remaining quarter comprising a coupling region of ring 105 to optical waveguide 103, which can include a point coupler (e.g. not an MZI (Mach-Zehnder interferometer) coupler as in the prior art).

In other words, in FIG. 1, a ratio of a first segment, along which first voltage control device 110-2 is located, to the second segment, along which second voltage control device 110-2 is located, is about 2:1, a first voltage V1 is about equal to third voltage V3, and second voltage V2 is about equal to fourth voltage V4.

In other words, it is assumed in the following discussion that voltage V1 is about equal to voltage V3, and that voltage V2 is about equal to voltage V4. Furthermore, it is assumed that voltage V2 is less than voltage V1, and hence voltage V4 is a less than voltage V3.

It can be further assumed that each driver device 111 comprises a non-linear driver device. Indeed, in implementations described herein where a ratio of a first segment, along which first voltage control device 110-2 is located, to the second segment, along which second voltage control device 110-2 is located, is one or more of about 2:1 and greater than 1:1, each of first driver device 111-1 and second driver device 111-2 can comprises a respective non-linear driver device. Such non-linear driver devices are fast compared to linear driver devices and as each non-linear driver device is controlled to only two given voltages, the effect of their non-linear response is minimized. The driving voltage conditions for each of the two output voltage are determined, and then each driver device 111 is changed between the two output voltages.

It is yet further assumed in the following discussion that the heater has been controlled to a given value such that an optical signal of a given wavelength is being modulated by ring 105; in particular, it is assumed that a wavelength of about 1544.22 nm is being modulated by ring 105, and heater is controlled accordingly such a minimum of a resonance curve of ring 105 is adjacent about 1544.22 nm (for example see FIG. 2). In particular, wavelength 1544.22 nm is located on a blue-side of a minimum of a resonance curve of ring 105. However, other wavelengths are within the scope of present implementations.

Attention is next directed to TABLE 1, below, in which a driving scheme for device 101 is provided, which can be stored at memory 122, for example in application 126 and/or as a lookup table which can be processed by controller 120, and the like. Furthermore, while TABLE 1 is provided in rows and columns, such a format is shown for simplicity, and TABLE 1 can be in any suitable format.

TABLE 1

| Data | Voltage Control Device 111-1 (Most Significant Bit) | Voltage Control Device 111-2 (Least Significant Bit) |
| --- | --- | --- |
| 00 | V1 | V3 |
| 01 | V1 | V4 |
| 10 | V2 | V3 |
| 11 | V2 | V4 |

For example, when voltage V1, and voltage V3 are applied to each of respective segments of voltage control devices 110-1, 110-2, by respective driver devices 111-1, 111-2, it is assumed that a corresponding amplitude modulation of the optical signal on optical waveguide 103 corresponds to an encoding of "00". Similarly, when voltage V1, and voltage V4 are applied to each of respective segments of voltage control devices 110-1, 110-2, by respective driver devices 111-1, 111-2, it is assumed that a corresponding amplitude modulation of the optical signal on optical waveguide 103 corresponds to an encoding of "01". Similarly, when voltage V2, and voltage V3 are applied to each of respective segments of voltage control devices 110-1, 110-2, by respective driver devices 111-1, 111-2, it is assumed that a corresponding amplitude modulation of the optical signal on optical waveguide 103 corresponds to an encoding of "10". And finally, when voltage V2, and voltage V4 are applied to each of respective segments of voltage control devices 110-1, 110-2, by respective driver devices 111-1, 111-2, it is assumed that a corresponding amplitude modulation of the optical signal on optical waveguide 103 corresponds to an encoding of "11".

In other words, as there are two segments of different lengths on ring 105 that can be tuned differently using two respective "high" and "low" voltages, four different amplitude modulations of the given wavelength of the optical signal on optical waveguide 103 can occur. In particular, when the two segments are of different lengths (e.g. a ratio of their lengths is greater than 1:1 and/or about 2:1) the high and low voltages can be the same, and/or about the same, for the two diodes and/or voltage control devices 110, and non-linear drivers can be used.

Figure 2:
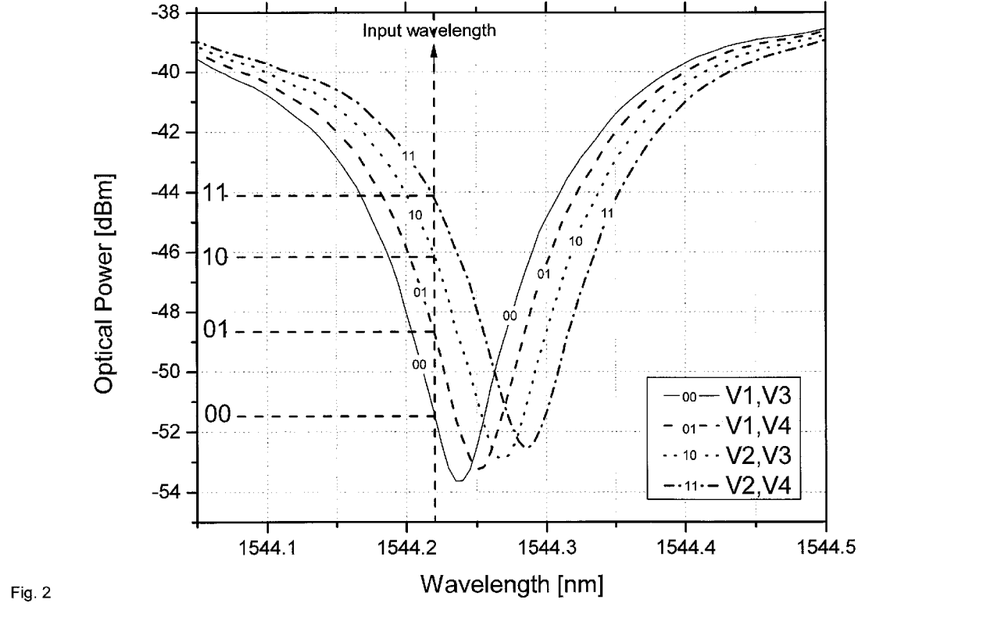
FIG. 2 depicts resonance properties of the device of FIG. 1 under four different voltage driving conditions, according to non-limiting implementations.

For example, attention is next directed to FIG. 2, which depicts four different resonance curves in terms of transmitted optical power (y-axis), in decibels, of ring 105 as a function of wavelength (x-axis). Also depicted in FIG. 2 is a reference wavelength of 1544.22 nm of the optical signal on optical waveguide 103 that is to be modulated.

Further depicted is a legend which indicates which pairs voltages V1, V2, V3, V4 are being applied to ring 105 by voltage control devices 110 for each curve, relative to TABLE 1. As depicted, it is assumed that: each voltage V1, V3 is about the same; each voltage V2, V4 is about the same; and that voltages V1, V3 are greater than voltages V2, V4. It is furthermore assumed that each voltage control device 110 comprises a respective diode operated in a reverse bias mode by a respective non-linear driver device (e.g. a respective driver device 111); depletion of each respective diode causes a resonance position of ring 105 to shift to larger wavelengths. In other words, changing a respective voltage of a respective diode from voltage V1, V3 to voltage V2, V4 causes the resonance curve in FIG. 2 to shift towards a higher wavelength (e.g. a red-shift occurs in the resonance).

Furthermore, each curve is labelled according to data represented by each set of voltage conditions, such that: curve 00 corresponds to an amplitude modulation corresponding to data "00" when voltages V1, V3 are applied to respective segment; curve 01 corresponds to an amplitude modulation corresponding to data "01" when voltages V1, V4 are applied to respective segments; curve 10 corresponds to an amplitude modulation corresponding to data "10" when voltages V2, V3 are applied to respective segments; and curve 11 corresponds to an amplitude modulation corresponding to data "11" when voltages V2, V4 are applied to respective segments.

It is apparent that with each successive voltage condition, a minimum of the resonance curves shift towards longer wavelengths, such that a position of the input wavelength on each successive curve 00, curve 01, curve 10, curve 11 shifts to a higher transmission optical power. In other words, amplitude of an optical signal of the input wavelength will have lower amplitude when voltages V1, V3 are applied to ring 105, then when voltages V2, V4 are applied to ring 105. Furthermore, the amplitude of each curve 00, curve 01, curve 10, curve 11 at the input wavelength corresponds to an optical modulation amplitude level of the input wavelength as each pair of voltages (V1, V3), (V1, V4), (V2, V3), (V3, V4) are applied to ring 105.

Furthermore, as the length of segment of ring 105 along which first voltage control device 110-1 is located is longer than the length of segment of ring 105 along which second voltage control device 110-2 is located, first voltage control device 110-1 will have a larger effect on shifting the resonance of ring 105 as compared to second voltage control device 110-2, for similar applied voltages; accordingly, second voltage control device 110-2 will hence have a comparatively smaller effect on shifting the resonance of ring 105 than first voltage control device 110-1 for similar applied voltages. This changing shift in resonance is reflected in FIG. 2, and further the shifts in resonance, and corresponding changes in amplitude of an optical signal of the input wavelength, due to second voltage control device 110-2 (which has a smaller effect), can correspond to a least significant bit of data encoding, and corresponding changes in amplitude of an optical signal of the input wavelength, due to first voltage control device 110-1 (which has a larger effect), can correspond to a most significant bit of data encoding.

Hence, the optical signal of the input wavelength can be amplitude modulated according to a PAM-4 scheme using device 101 (e.g. PAM-N where $N=2^x$ and $x=2$).

In other words, device 101 can convert two synchronized and phase aligned NRZ electrical signals into a PAM4 optical signal which can generally eliminate a need for a PAM4 encoder. In implementations where each voltage control device 110 comprises a respective diode, one NRZ signal can be applied to the small diode (Least Significant Bit—LSB) at ring 105 and the second NRZ signal can be applied to the large diode (Most Significant Bit—MSB) at ring 105. Voltage across each respective diode creates an electrical field that causes the optical resonance frequency and/or optical resonance wavelength of ring 105 to shift. The shift is proportional to a size and/or length of a respective diode and/or a segment of ring 105 along which a respective diode is located.

As depicted the large diode (first voltage control device 110-1) that is about twice a size of the small diode (second voltage control device 110-2); hence, the large diode (first voltage control device 110-1) will generate about twice the resonance shift for the same applied voltage as the small diode (second voltage control device 110-2). Given the nature of resonant ring modulators, the equally spaced resonance shift will lead to unequally spaced optical modulation amplitude levels. Hence, in practise, the ratio of the length of the larger diode to the length of the smaller diode is generally adjusted to be different from 2:1, to adjust separation between optical modulation amplitude levels.

Furthermore, the position of the optical modulation amplitude levels generally depends on the position of the input wavelength relative to the resonance locations each curve 00, curve 01, curve 10, curve 11 so thermal tuning of the resonance location can be used optimize the resulting PAM4 response. For example, the heater of device 101 is used to position an initial resonance of ring 105 such that the input wavelength is at a given location relative to each curve 00, curve 01, curve 10, curve 11. For example, the heater of device 101 can be calibrated and/or designed and/or provisioned to modulate one or more given input wavelength and a look-up table, and the like, can be stored at memory 122 to provide heater parameters to which the heater of device 101 is controlled to modulate the one or more given input wavelengths.

In general, the position of the input wavelength relative to the resonance wavelength of each of curve 00, curve 01, curve 10, curve 11 can be selected to maximize separation between optical modulation amplitude levels, though input wavelength can also be at a position relative to the resonance wavelength of each of curve 00, curve 01, curve 10, curve 11 where less than maximize separation between optical modulation amplitude levels occurs. For example, the position of the input wavelength relative to the resonance wavelength of each of curve 00, curve 01, curve 10, curve 11 be selected such that separation between optical modulation amplitude levels is about evenly spaced on a log-scale.

However, such shifts in amplitude need not be exactly evenly spaced. For example as depicted in FIG. 2, for the input wavelength, where transmission is at about 51.5 dB for curve "00", about −48.5 dB for curve "01", about −46 dB for curve "10", and about −44 dB for curve "11".

In any event, by simultaneously applying synchronous and phase aligned digital signals to the diodes a multi-level optical signal can be generated. In other words, device 101, as well as converting electrical signals into optical signal, can also act as a digital to analogue converter (DAC).

As described above, device 101 can be used in optical transmission system applications. In particular, PAM-4 is a modulation technique that doubles spectral density through multi-level coding. Two bits are transmitted in the same time period as a single bit in a NRZ based system. So, for a symbol rate of 28 Gbaud, 56 Gb/s is transmitted with PAM-4. Optical fibers used in optical transmission have limited bandwidth, so PAM-4 allows the transmission capacity of the fiber to be doubled thereby reducing system cost. Hence device 101 configured to PAM-4 optical modulation can be used for Datacom applications within data centers and between data centers and in short reach telecommunication networks (including, but not limited to (access and metro telecommunication networks).

Furthermore, a size of a PIC of device 101 can be smaller than a PIC of prior art devices. For example, a radius of a ring modulator is about 23 μm, as compared to 1 mm long Mach Zehnder ("MZ") modulators with multi-segment phase shifters and MZ assisted ring modulators of a length of about 340 μm. Hence the present device can be more compact than such prior art devices. The present device can also be faster than the prior art devices, for example 28 Gbaud as compared to 120 Mb/s of some prior art devices.

In addition, relative to a single diode ring modulator with a single linear (analogue) driver, a product cost can be reduced (about 5% at product level) and power dissipation can be lower (about 10% reduction at product level) as non-linear CMOS drivers can be used in place of analogue SiGe drivers.

Persons skilled in the art will appreciate that there are yet more alternative implementations and modifications possible. For example, the ratio of the size of voltage controls devices 110 (e.g. two diodes) can deviate from 2:1. Rather than targeting a ratio in resonance shift between the MSB and LSB, the voltage control device/diode sizes can be selected designed to produce target optical output levels after modulation, which takes into account a non-linear optical transfer function of the ring, a modulator driver waveform and noise performance, including noise contributed by downstream optical amplifiers, and non-ideal responses of downstream linear channels (optical detectors plus transimpedance amplifiers).

Indeed, in particular implementations the ratio of the voltage control device/diode sizes can be about 1:1. For example, attention is next directed to FIG. 3 which depicts a device 301 that is substantially similar to device 101, with like elements having like numbers, however in a "300" series rather than a "100" series. Hence, device 301 comprises an optical waveguide 303; an optical ring modulator 305 optically coupled to optical waveguide 303; a first voltage control device 310-1 along a first segment of optical ring modulator 305; a second voltage control device 310-2 along a second segment of optical ring modulator 305; a first driver device 311-1 configured to control first voltage control device 310-1 to a first voltage V1 and a second voltage V2; and, a second driver device 311-2 configured to control second voltage control device 310-2 to a third voltage V3 and a fourth voltage V4. Optical ring modulator 305 will hereafter be interchangeably referred to as ring 305. First voltage control device 310-1 and second voltage control device 310-2 will hereafter be referred to, collectively, voltage control devices 310 and, generically, as a voltage control device 310; and first driver device 311-1 and second driver device 311-2 will hereafter be referred to, collectively, driver devices 311 and, generically, as a driver device 311. Device 101 further comprises a controller 320, a memory 322 and an interface 324, memory storing application 326, a laser 344, an input 385 and an output 395.

Figure 3:
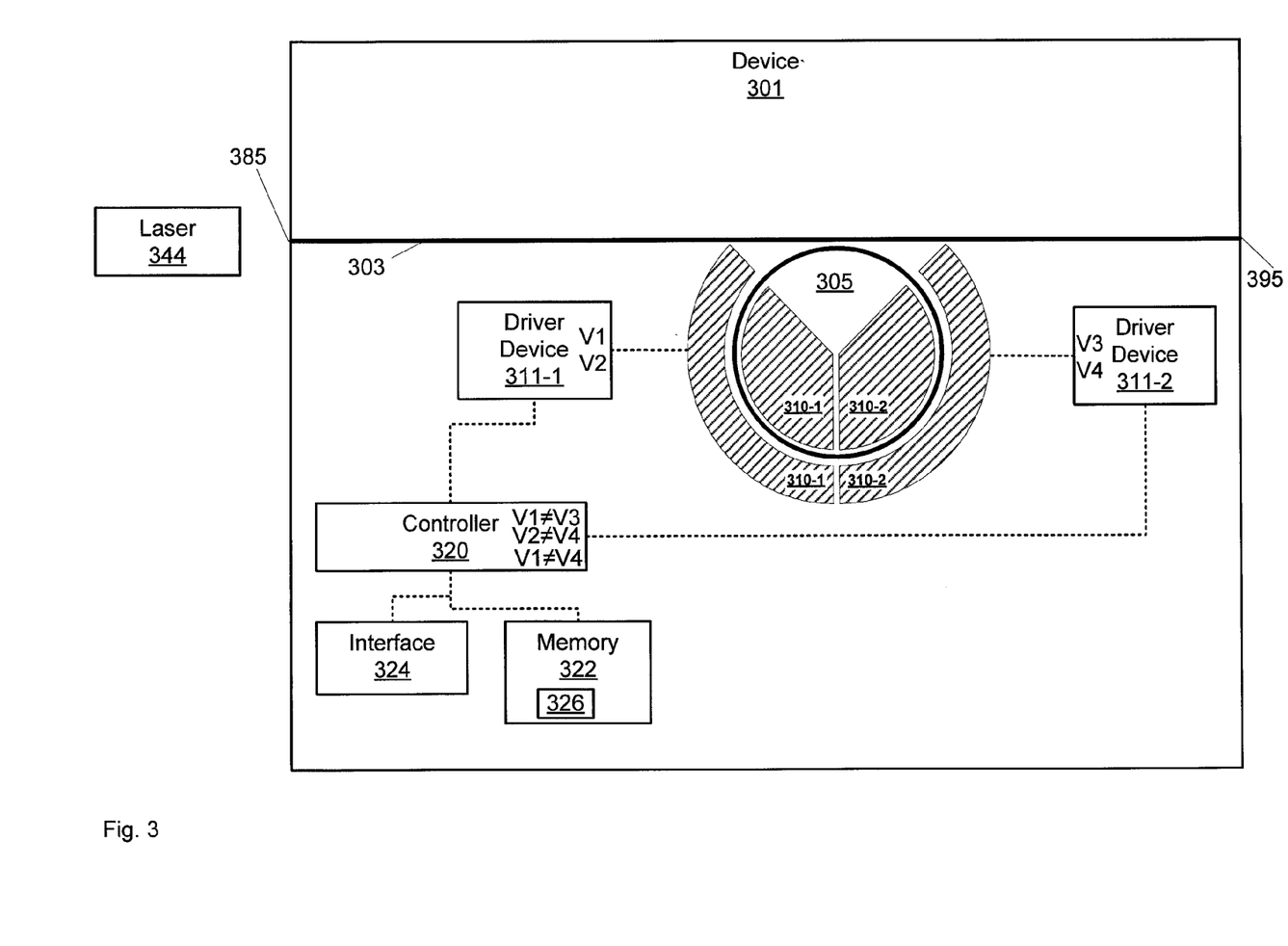
FIG. 3 depicts a schematic diagram of a device that includes a two-segment optical ring modulator of similar lengths, according to non-limiting implementations.

However, in contrast to device 101, in device 301, a ratio of the first segment, along which first voltage control device 310-1 is located, to the second segment, along which second voltage control device 310-2 is located, is about 1:1, the first voltage V1, the second voltage V2, the third voltage V3 and the fourth voltage V4 all being different from one another. In particular, the first voltage V1 can be about the same as the third voltage V3 (for example for a depletion modulator), and the second voltage V2 is different than the fourth voltage V4. In some implementations, however, the first voltage V1 can be different from the third voltage V3, and the second voltage V2 can be about the same as the fourth voltage V4. In other words, at least one the following conditions apply: the third voltage V3 is different from the first voltage V1; and the fourth voltage V4 is different from the second voltage V2. Each of the voltages V1, V2, V3, V4 are selected to effect good separation between the transmission curves of ring 305 for each pair of voltages applied to ring 305. Hence, four different voltage conditions are applied to ring 305, as in device 101 to control the transmission curve of ring 305.

In other words, as the modulation effect of each voltage control device 310 will be about the same due their similar length and/or size, at least one of the respective "high" and "low" voltages of each voltage control device 310 are different to effect four different voltage conditions are applied to ring 305, as in device 101, which again causes separation of the transmission curves of ring 305. As such, linear driver devices can be used to more precisely control the voltages. This can lead to slower operation than device 101, as linear driver devices tend to be slower than non-linear driver devices, otherwise, operation of device 301 is similar to device 101. Furthermore, the power dissipation of device 301 can be higher than device 101 to achieve good separation between the transmission curves.

In yet further implementations, modulation of device 101 can be extended to higher order modulation, including, but not limited to, PAM-8 modulation, by using three or more voltage control devices and/or diodes where, approximately, the largest voltage control device/diode is twice the size of a middle-sized voltage control device/diode, which in turn is twice the size of the smallest voltage control device/diode. In other words, device 101 can be modified to include: one or more further voltage control devices 110 (i.e. in addition to voltage control devices 110-1, 110-2) along respective further segments of optical ring modulator 105; and, one or more further driver devices 111 (i.e. in addition to driver devices 111-1, 111-2) each configured to control a respective further voltage control device 110 to two respective voltages.

Figure 4:
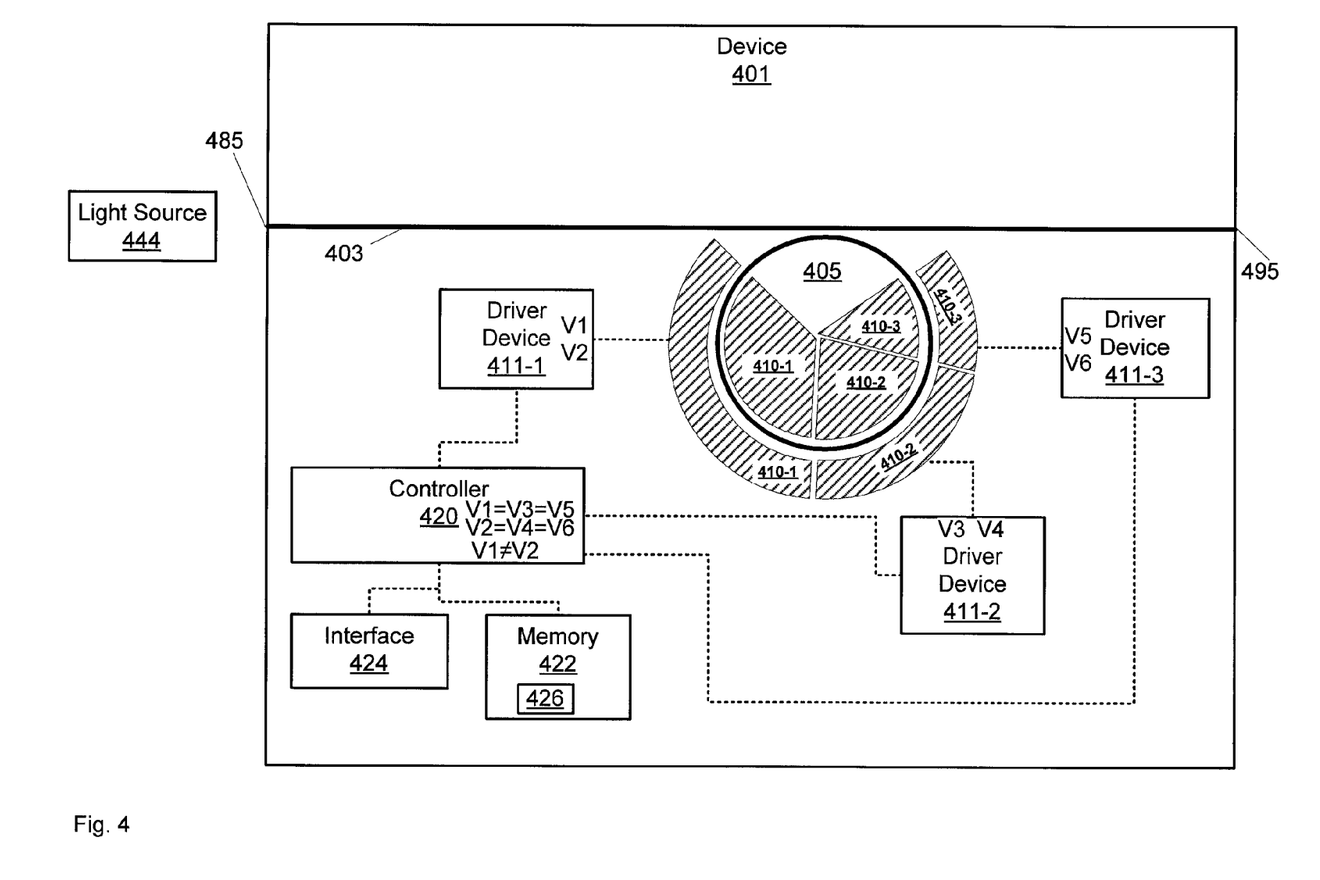
FIG. 4 depicts a schematic diagram of a device that includes a three-segment optical ring modulator of different lengths, according to non-limiting implementations.

For example, attention is next directed to FIG. 4 which depicts a device 401 that is substantially similar to device 101, with like elements having like numbers, however in a "400" series rather than a "100" series. Hence, device 401 comprises an optical waveguide 403; an optical ring modulator 405 optically coupled to optical waveguide 403; a first voltage control device 410-1 along a first segment of optical ring modulator 405; a second voltage control device 410-2 along a second segment of optical ring modulator 405; a first driver device 411-1 configured to control first voltage control device 410-1 to a first voltage V1 and a second voltage V2; and, a second driver device 411-2 configured to control second voltage control device 410-2 to a third voltage V3 and a fourth voltage V4. Optical ring modulator 405 will hereafter be interchangeably referred to as ring 405. Device 101 further comprises a controller 420, a memory 422 and an interface 424, memory storing application 426, a laser 444, an input 485 and an output 495.

However, in contrast to device 101, device 401 further comprises: a third voltage control 410-3 device along a third segment of optical ring modulator 405; and, a third driver device 411-3 configured to control third voltage control device 410-1 to a fifth voltage V5 and a sixth voltage V6.

First voltage control device 410-1, second voltage control device 410-2, and third voltage control device 410-3 will hereafter be referred to, collectively, voltage control devices 410 and, generically, as a voltage control device 410; and first driver device 411-1, and third driver device 411-3 will hereafter be referred to, collectively, driver devices 411 and, generically, as a driver device 411.

Voltage V5 can be about equal to voltages V1, V3, and voltage V6 can be about equal to voltages V2, V4. Further, a ratio of a length of a first segment, along which first voltage control device 410-1 is located, to a length of a second segment, along which second voltage control device 410-2 is located, can be about 2:1; and a ratio of a length of the second segment, along which second voltage control device 410-2 is located, to a length of a third segment, along which third voltage control device 410-3 is located, can also be about 2:1. For example, voltage control devices 410 can be along about three quarters of a diameter of ring 405, and the three quarters segmented accordingly with respect to the aforementioned ratios. However, the aforementioned ratios can also deviate from 2:1, to obtain desired separation of transmission curves of ring 405.

In any event, as each of three voltage control devices 410 is controlled independently to one of two voltages, 3 bits can be encoded in modulation of an optical signal being transmitted over optical waveguide 403: 000, 001, 010, 011, 100, 101, 110, 111, with encoding of the least significant bit occurring using third voltage control device 410-3 (i.e. the smallest of the three voltage control devices 410), encoding of the most significant bit occurring using first voltage control device 410-1 (i.e. the largest of the three voltage control devices 410), and encoding of the middle bit occurring using second voltage control device 410-2 (i.e. of a size in-between the other two voltage control devices 410).

Furthermore, each driver device 411 can comprise a non-linear driver device, as in device 101. Otherwise, operation of device 401 is similar to device 101, however PAM-8 encoding occurs (e.g. PAM-N where $N=2^x$ and $x=3$).

The concept can be extended to PAM-16, by using four voltage control modulators, to PAM-32 using five voltage control modulators. Indeed, any PAM-N encoding scheme can be used where $N=2^x$ and $x=$a number of voltage control modulators.

In any event, described herein is a device that includes at least two voltage control devices and/or diodes along an optical ring modulator; when diodes of different lengths and/or sizes are used, the diodes can be operated in a reverse bias (e.g. depletion) mode to provide high speed performance. Such a device can used for PAM-N modulation, and can have reduced physical size (and/or higher density), simplified coupling, and high speed operation as compared to prior art devices.

Those skilled in the art will appreciate that in some implementations, the functionality of devices 101, 301, 401 can be implemented using pre-programmed hardware or firmware elements (e.g., application specific integrated circuits (ASICs), electrically erasable programmable read-only memories (EEPROMs), etc.), or other related components. In other implementations, the functionality of computing devices 101, 301, 401 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency (RF), microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    an optical waveguide;
    an optical ring modulator optically coupled to the optical waveguide;
    a first voltage control device along a first segment of the optical ring modulator;
    a second voltage control device along a second segment of the optical ring modulator;
    a first driver device configured to control the first voltage control device to a first voltage and a second voltage to control a resonance of the optical ring modulator according to a most significant bit of data encoding; and,
    a second driver device configured to control the second voltage control device to a third voltage and a fourth voltage to control the resonance of the optical ring modulator according to least significant bit of data encoding.

2. The device of claim 1, wherein a ratio of respective lengths of the first segment, where the first voltage control device is located, to the second segment, where the second voltage control device is located is about 2:1, the first voltage being about equal to the third voltage, and the second voltage being about equal to the fourth voltage.

3. The device of claim 1, wherein a ratio of respective lengths of the first segment, where the first voltage control device is located, to the second segment, where the second voltage control device is located, is one or more of greater than 1:1 and about 2:1, the first voltage being about equal to the third voltage, and the second voltage being about equal to the fourth voltage.

4. The device of claim 3, wherein each of the first driver device and the second driver device comprises a respective non-linear driver device.

5. The device of claim 1, wherein a ratio of respective lengths of the first segment, where the first voltage control device is located, to the second segment, where the second voltage control device is located is about 1:1, wherein at least one of: the third voltage is different from the first voltage; and the fourth voltage is different from the second voltage.

6. The device of claim 5, the third voltage is about the same as the first voltage, and the fourth voltage is different from the second voltage.

7. The device of claim 1, wherein each of the first voltage control device and the second voltage control device comprise a respective diode, a respective junction of the respective diode located along a respective segment of the optical ring modulator.

8. The device of claim 1, wherein each of the first voltage control device and the second voltage control device comprise a respective diode, each of the first driver device and the second driver device configured to operate the respective diode in a reverse bias mode.

9. The device of claim 1, further comprising: one or more further voltage control devices along respective further segments of the optical ring modulator; and, one or more further driver devices each configured to control a respective further voltage control device to two respective voltages to control the resonance of the optical ring modulator according to further significant bits of data encoding.

10. The device of claim 1, further comprising a controller in communication with the first driver device and the second driver device, the controller configured to: convert data to be transmitted along the optical waveguide into a pulse amplitude modulation (PAM) compatible format; and control each of the first driver device and the second driver device to in turn control a respective voltage control device to modulate an optical signal on the optical waveguide to encode the data therein.

11. The device of claim 1, further comprising a heater configured to maintain a given temperature of the optical ring modulator.

12. The device of claim 1, further comprising a laser configured to provide an optical signal along the optical waveguide, the optical signal modulated by the optical ring modulator.

* * * * *